United States Patent
Chang et al.

(10) Patent No.: US 8,073,026 B2
(45) Date of Patent: Dec. 6, 2011

(54) METHOD AND APPARATUS FOR CONTROLLING CARRIER ENVELOPE PHASE

(75) Inventors: Zenghu Chang, Manhattan, KS (US); Chengquan Li, Sunnyvale, CA (US); Eric Moon, Manhattan, KS (US)

(73) Assignee: Kansas State University Research Foundation, Manhattan, KS (US)

( * ) Notice: Subject to any disclaimer, the term of this patent is extended or adjusted under 35 U.S.C. 154(b) by 100 days.

(21) Appl. No.: 12/306,348

(22) PCT Filed: Jun. 21, 2007

(86) PCT No.: PCT/US2007/071731
§ 371 (c)(1),
(2), (4) Date: Sep. 23, 2009

(87) PCT Pub. No.: WO2007/149956
PCT Pub. Date: Dec. 27, 2007

(65) Prior Publication Data
US 2010/0061411 A1    Mar. 11, 2010

Related U.S. Application Data

(60) Provisional application No. 60/805,717, filed on Jun. 23, 2006.

(51) Int. Cl.
*H01S 3/13* (2006.01)
(52) U.S. Cl. .................................. 372/29.011
(58) Field of Classification Search ............. 372/29.011, 372/25
See application file for complete search history.

(56) References Cited

U.S. PATENT DOCUMENTS

| | | | |
|---|---|---|---|
| 7,010,231 B1 | 3/2006 | Franco et al. | |
| 2004/0017833 A1* | 1/2004 | Cundiff et al. | 372/18 |
| 2004/0190911 A1 | 9/2004 | Franco et al. | |
| 2005/0271094 A1* | 12/2005 | Miller et al. | 372/25 |
| 2007/0171945 A1 | 7/2007 | Liu et al. | |

OTHER PUBLICATIONS

PCT Preliminary Report on Patentability for International Application No. PCT/US2007/071731 dated Jan. 15, 2009 (2 pgs).
PCT Written Opinion of the Searching Authority for International Application No. PCT/US2007/071731 dated Feb. 28, 2008 (3 pgs).

* cited by examiner

*Primary Examiner* — Patrick Stafford
(74) *Attorney, Agent, or Firm* — Hovey Williams LLP

(57) ABSTRACT

A chirped pulse amplification laser system. The system generally comprises a laser source, a pulse modification apparatus including first and second pulse modification elements separated by a separation distance, a positioning element, a measurement device, and a feedback controller. The laser source is operable to generate a laser pulse and the pulse modification apparatus operable to modify at least a portion of the laser pulse. The positioning element is operable to reposition at least a portion of the pulse modification apparatus to vary the separation distance. The measurement device is operable to measure the carrier envelope phase of the generated laser pulse and the feedback controller is operable to control the positioning element based on the measured carrier envelope phase to vary the separation distance of the pulse modification elements and control the carrier envelope phase of laser pulses generated by the laser source.

19 Claims, 4 Drawing Sheets

METHOD AND APPARATUS FOR CONTROLLING CARRIER ENVELOPE PHASE

RELATED APPLICATION

The present non-provisional application is a national stage application under 35 U.S.C. 371 of international application PCT/US2007/071731, filed Jun. 21, 2007, which claims the benefit of U.S. Provisional Application No. 60/805,717, entitled "STABILIZATION OF CARRIER ENVELOPE PHASE BY FEEDBACK CONTROLLING GRATING SEPARATION," filed Jun. 23, 2006. The identified provisional application is incorporated herein by specific reference.

FEDERALLY SPONSORED RESEARCH OR DEVELOPMENT PROGRAM

The present invention was developed with support from the U.S. government under Grant No. DE-FG02-86ER13491 awarded by the Department of Energy and Grant No. 0457269 awarded by the National Science Foundation. Accordingly, the U.S. government has certain rights in the present invention.

BACKGROUND OF THE INVENTION

1. Field of the Invention

Embodiments of the present invention relate generally to methods and apparatuses for controlling carrier envelope phase. Particularly, various embodiments of the present invention provide methods and apparatuses for controlling carrier envelope phase by controlling grating separation.

2. Description of the Related Art

Chirped pulse amplification (CPA) laser systems are often utilized to amplify laser pulses to millijoule level or higher energies. For example, CPA laser systems may be employed to generate high-power laser pulses to study various aspects of atomic physics, such as attosecond pulse generation, above threshold ionization, and molecular dissociation. It is often necessary to stabilize the carrier envelope phase of generated laser pulses to prevent measurement errors. It is known to stabilize carrier envelope phase by adding feedback loops to the oscillators employed by CPA systems. Unfortunately, adding a feedback loop to an oscillator may disturb the oscillator's output power and limit feedback bandwidth, thereby interfering with the output of the CPA laser system.

SUMMARY OF THE INVENTION

Embodiments of the present invention solve the above-described problems and provide a distinct advance in the art of controlling carrier envelope phase. More particularly, various embodiments of the invention provide methods and apparatuses for controlling carrier envelope phase by controlling a grating separation.

In various embodiments the present invention provides a chirped pulse amplification laser system that comprises a laser source, a pulse modification apparatus including first and second pulse modification elements separated by a separation distance, a positioning element, a measurement device, and a feedback controller. The laser source is operable to generate a laser pulse and the pulse modification apparatus operable to modify at least a portion of the laser pulse. The positioning element is operable to reposition at least a portion of the pulse modification apparatus to vary the separation distance. The measurement device is operable to measure the carrier envelope phase of the generated laser pulse and the feedback controller is operable to control the positioning element based on the measured carrier envelope phase to vary the separation distance of the pulse modification elements and control the carrier envelope phase of at least one laser pulse generated by the laser source.

It is to be understood that both the foregoing general description and the following detailed description are exemplary and explanatory only and are not necessarily restrictive of the invention claimed. The accompanying drawings, which are incorporated in and constitute a part of the specification, illustrate embodiments of the invention and together with the general description, serve to explain the principles of the invention.

BRIEF DESCRIPTION OF THE DRAWING FIGURES

Embodiments of the present invention are described in detail below with reference to the attached drawing figures, wherein.

Figure 1:
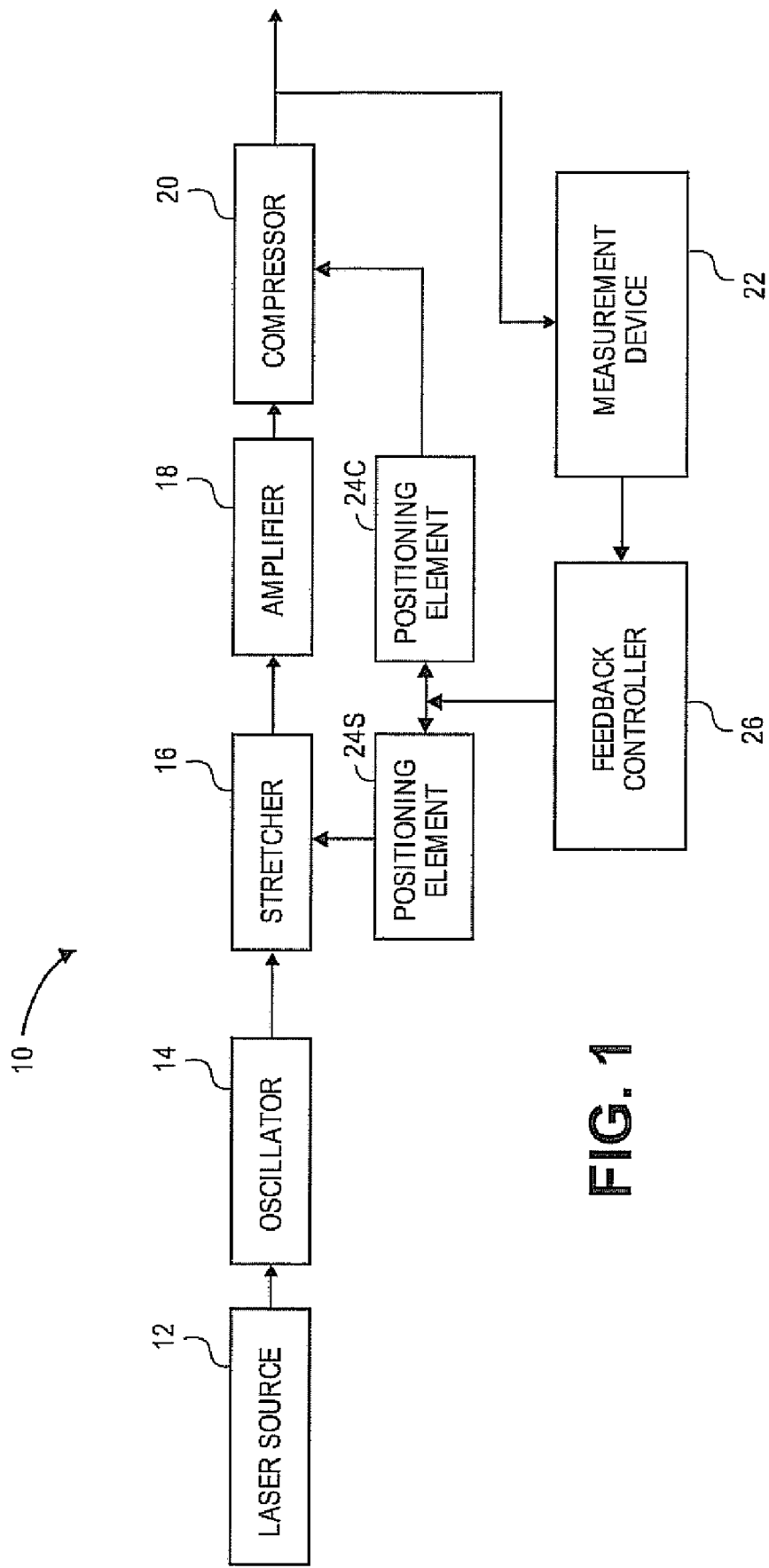
FIG. 1 is a block diagram of a laser system configured in accordance with various embodiments of the present invention.

The drawing figures do not limit the present invention to the specific embodiments disclosed and described herein. The drawings are not necessarily to scale, emphasis instead being placed upon clearly illustrating various embodiments of the invention.

DETAILED DESCRIPTION OF THE PREFERRED EMBODIMENTS

The following detailed description of various embodiments of the invention references the accompanying drawings which illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

Various embodiments of the present invention utilize a laser system 10 as illustrated in FIG. 1. In some embodiments, the laser system 10 is configured as a chirped pulse amplification (CPA) laser system that includes a pulse modification apparatus operable to stretch and/or compress a laser pulse.

As is known in the art, a CPA laser system generally creates a high-power laser pulse through the use of components that perform a chirping function. A laser source creates a short-duration pulse of energy that includes multiple wavelengths of radiation. The pulse may have a duration, for example, on the order of tens of femtoseconds, and an energy, for example, on the order of nanojoules. The laser pulse is coupled into a chirping system that includes a stretcher and a compressor. The function of the stretcher is to stretch the laser pulse temporally, or disperse the pulse; thereby delaying the different wavelength components of the pulse at different rates, such that, typically, the shorter wavelengths are delayed more than the longer wavelengths. Thus, the shorter wavelengths exit the stretcher later in time than the longer wavelengths. After exiting the stretcher, the duration of the pulse is on the order of ten thousand times greater than it was entering the stretcher. Stretching the duration of the pulse also has the effect of reducing the power of the waveform by the same factor. The pulse is said to be chirped.

The chirped pulse is then amplified through a gain medium of one or more stages by a factor of $10^6$ or higher. The amplified, chirped pulse enters the compressor, which compresses the laser pulse temporally in an equal and opposite fashion as the stretcher. Hence, longer wavelengths are delayed more than shorter wavelengths, such that the duration of the laser pulse is reduced to approximately what it was before chirping. Just as critical, the peak power of the pulse is increased by the same factor so that the power of the pulse is on the order of $10^{12}$ W.

In some embodiments, the laser system 10 can include a laser source 12, an oscillator 14, a stretcher 16, an amplifier 18, a compressor 20, a measurement device 22, positioning elements 24s and 24c, and a feedback controller 26. As is discussed in more detail below, the laser system 10 is operable to generate laser pulses with a generally stable carrier envelope (CE) phase by adjusting a separation distance employed by the stretcher 16 and/or compressor 20.

Figure 6:
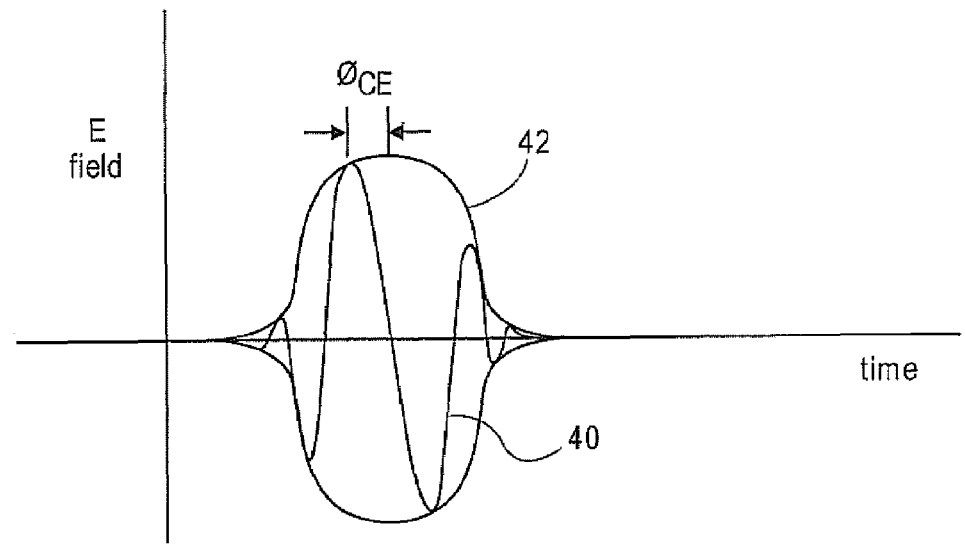
FIG. 6 is a graph illustrating a carrier envelope phase.

The electric field of radiation emitted from a laser, such as the oscillator 14, is generally characterized as shown in FIG. 6, with a higher-frequency carrier wave 40 oscillating within a lower-frequency envelope 42. The CE phase, $\phi_{CE}$, is the difference in time between the peak of the envelope wave 42 and the closest peak of the carrier wave 40.

The laser source 12, oscillator 14, and amplifier 18 may be generally conventional CPA laser systems elements as discussed above. Thus, for example, the laser source 12 may comprise any elements or combination of elements operable to generate or pump laser light. The laser source 12 may include a pump laser such as a Verdi 6 laser and/or the laser source disclosed by U.S. Pat. No. 7,050,474, which is incorporated herein by reference. The laser source 12 may also include an acousto-optic modulator (AOM) that stabilizes the offset frequency of the laser signal by modulating the power of the signal. In various embodiments, the laser source 12 may include the oscillator 14.

The oscillator 14 may include any elements or combination of elements operable to generate a laser pulse at a desired wavelength, amplitude, and duration. In some embodiments, the oscillator 14 may employ any conventional carrier phase envelope stabilization techniques as is known in the art. The oscillator 14 may include a chirped-mirror compensated Ti:sapphire femtosecond oscillator. As should be appreciated, the laser source 12 and oscillator 14 may be operable to generate a plurality of laser pulses.

To obtain high output power from the laser system 10, a Pockels cell (PC) may be utilized to select pulses from the oscillator 14 that have the same carrier envelope phase. The PC may provide the selected pulses to the stretcher 16 for stretching. Providing pulses having the same or similar carrier envelope phase to the stretcher 16 is desirable as it simplifies measurement and enables carrier envelope phase to be more readily corrected.

The oscillator 14 may also include an f-to-2f interferometer of the Mach-Zehnder type and a locking electronics unit like the femtosecond phase stabilization unit XPS800, manufactured by Menlosystems GmbH. Typically, the interferometer receives a signal from the oscillator itself from which the interferometer generates a carrier-envelope offset frequency. The locking electronics unit takes the offset frequency and generates an error signal that may be fed back to the AOM of the laser source 12 which modulates the laser source 12 signal.

The stretcher 16 is operable to stretch laser pulses to increase the duration of a laser pulse utilizing one or more pulse modification elements such as diffraction gratings (also simply known as gratings), prisms, mirrors, lenses, combinations thereof, and the like. For example, pulses may be stretched to approximately 80 ps to facilitate amplification by the amplifier 16 as is discussed in more detail below. The stretcher 16 may employ any stretching configuration known in the art.

Figure 2:
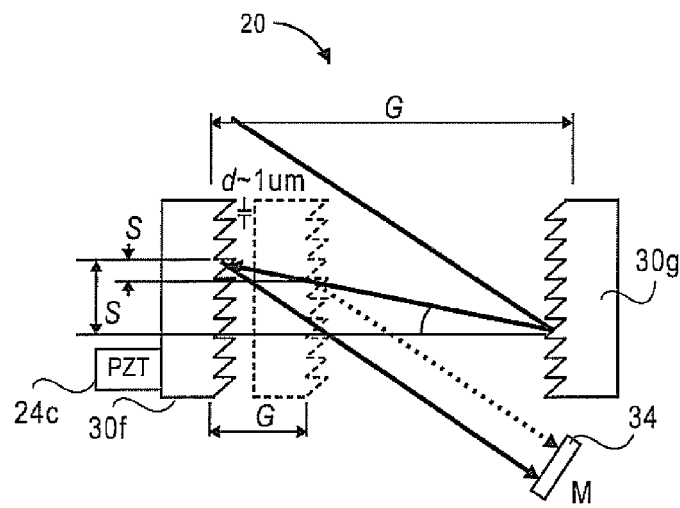
FIG. 2 is a schematic diagram of a grating compressor operable to be utilized by embodiments of the present invention.

Exemplary gratings are shown in enlarged form in FIG. 2 as 30f and 30g. As can be seen, each grating 30f, 30g includes a plurality of parallel and equally spaced grooves that are etched typically on glass. The grooves have a groove separation d, as indicated in FIG. 2, which may be on the order of 1 μm.

Figure 4:
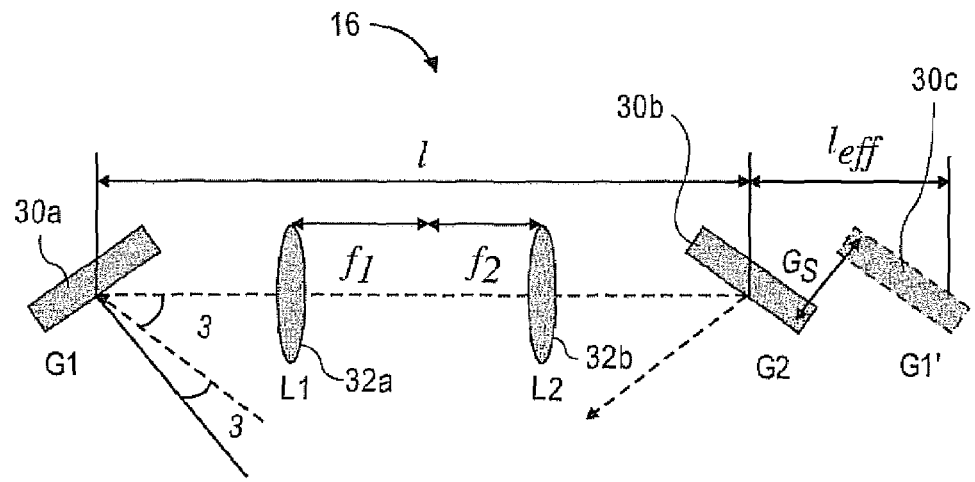
FIG. 4 is a schematic diagram of a grating stretcher operable to be utilized by embodiments of the present invention.
Figure 5:
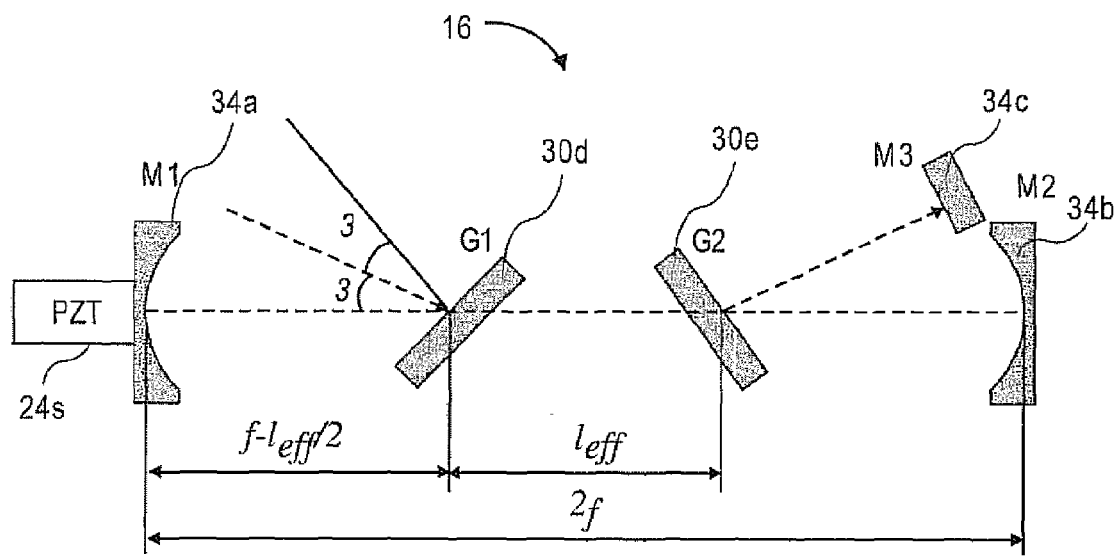
FIG. 5 is a schematic diagram of another grating stretcher operable to be utilized by embodiments of the present invention.

In some embodiments, as illustrated in FIGS. 4 and 5, the stretcher 16 may be a diffraction grating stretcher (also simply known as a grating stretcher) that utilizes one or more gratings to stretch laser pulses.

The grating stretcher 16 of FIG. 4 employs a lens-based telescope and includes two gratings 30a and 30b, and one or more lenses 32, such as lenses 32a, 32b, to stretch laser pulses. Grating 30c is the image of grating 30a that is formed by the telescope.

The grating stretcher embodiment of FIG. 5 employs a mirror-based telescope and includes gratings 30d, 30e and one or more mirrors 34, such as mirrors 34a, 34b, and 34c, to stretch laser pulses. As should be appreciated by those skilled in the art, the stretcher 16 may utilize any combination of pulse modification elements to at least partially stretch a laser pulse such that the stretcher 16 is not limited to the particular examples articled above.

Laser pulses that are stretched by the stretcher 16 are provided to the amplifier 18 for amplification. As discussed above, the amplifier 18 may utilize generally conventional amplification elements to amplify the stretched laser pulse to any desired power level. For example, the amplifier 18 may amplify a 3 nJ, 80 ps, laser pulse to a 5 mJ laser pulse. In some embodiments, the amplifier 18 may employ a 14-pass Ti:Sapphire crystal amplifier to amplify pulses. The amplifier 18 may also employ liquid nitrogen cooling to facilitate amplification to desired levels and employ any conventional carrier phase envelope stabilization techniques as is known in the art.

The compressor 20 is operable to compress laser pulses that have been stretched by the stretcher 16 and amplified by the amplifier 18. The compressor 20 may utilize utilizing one or more of the pulse modification elements, such as gratings 30, prisms 36, mirrors 34, lenses 32, combinations thereof, and the like, to compress amplified laser pulses to a desired duration. In some embodiments, the compressor 20 is operable to compress 80 ps laser pulses amplified by the amplifier to 25 fs. The compressor 20 may employ any compressor configuration known in the art.

Figure 3:
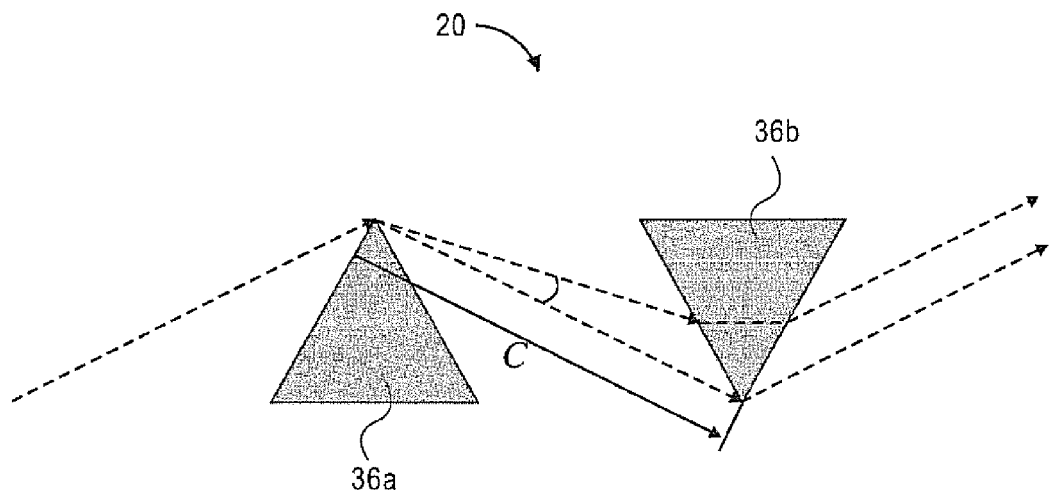
FIG. 3 is a schematic diagram of a prism compressor operable to be utilized by embodiments of the present invention.

In some embodiments, as illustrated in FIG. 2, the compressor 20 may include a grating compressor that utilizes at least two gratings 30f, 30g, to compress laser pulses. The gratings 30f, 30g are separated by the illustrated separation distance G. In other embodiments, as illustrated in FIG. 3, the compressor 20 can include a prism compressor that utilizes at least two prisms 36, such as prisms 36a, 36b to compress laser pulses. The apexes of prisms 36a, 36b are also separated by a separation distance G.

The laser pulses compressed by the compressor 20 may be directed to an output, such as a target, utilizing one or more of the pulse modification elements and/or generally conventional methods to apply one or more amplified pulses to the target.

In various embodiments, the measurement device 22 is adapted to measure one or more of the compressed laser pulses to identify the carrier envelope phase of the compressed laser pulses. The measurement device 22 may include a beam splitter that is operable to feed a portion of the output pulse generated by the compressor 20 to a collinear f-to-2f interferometer to measure the carrier phase envelope, or variations thereof, of a plurality of laser pulses. However, the measurement device 22 may include any element or combination of elements operable to measure the carrier phase envelope of one or more generated pulses, such as a phase meter based on the measurement of spatial asymmetry the above-threshold ionization signals.

The feedback controller 26 is operable to receive a signal from the measurement device 22 and send an output control signal to the positioning elements 24s, 24c. The feedback controller 26 may include electronic signal processing equipment such as a computer or other data processing element that is operable to run custom software applications, general-purpose electronic circuits such as microprocessors, microcontrollers, or field-programmable gate arrays (FPGAs), or application-specific integrated circuits, or combinations thereof.

Figure 7:
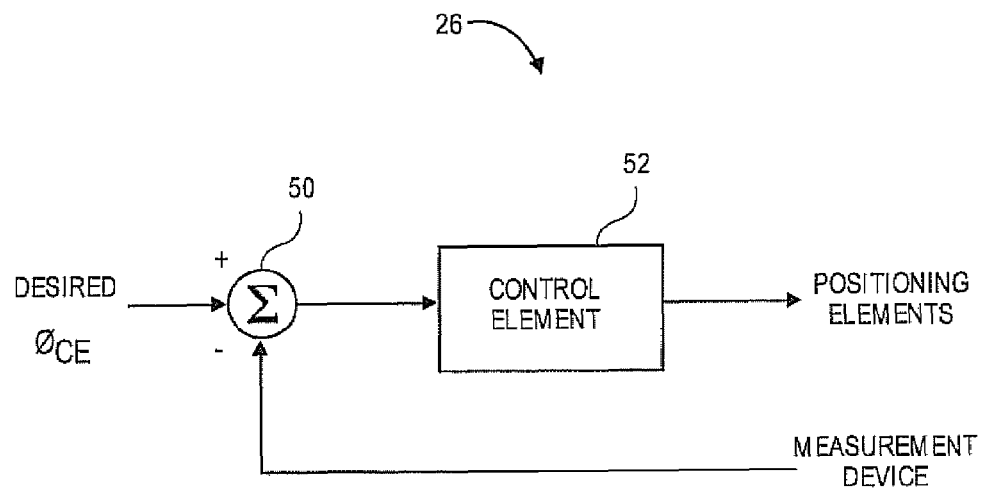
FIG. 7 is a schematic diagram of a feedback controller operable to be utilized by embodiments of the present invention.

Generally, the feedback controller 26 receives an electronic input signal from the measurement device 22 and outputs one or more electronic signals to positioning elements 24s, 24c. The feedback controller 26 may also include the structure of a negative feedback control system as shown in FIG. 7. The feedback signal from the measurement device 22 is coupled as a negative input to a summation element 50. The desired CE phase is a positive input to the summation element 50. The output of the summation element 50 is coupled to a control element 52. Various control circuit configurations are possible for the control element such as a proportional-integral-derivative (PID) controller, which can be implemented by both hardware and software. The output of the control element 52 is coupled to the positioning elements 24s, 24c.

The positioning elements 24s, 24c are operable to control the position of components of the stretcher 16 and the compressor 20, such as lenses, mirrors, and gratings. The positioning elements 24s, 24c may include electronically-powered translation stages with piezoelectric transducer (PZT) elements onto which lenses, mirrors, gratings, etc. may be mounted. An example of a PZT stage is the MAX311 manufactured by Thorlabs, Inc. The positioning elements generally may receive a signal from the feedback controller 26 to move the components of the stretcher 16 and the compressor 20 in either direction along one linear axis. In some embodiments, the laser system 10 may include only one of the positioning elements 24s, 24c.

The positioning element 24s is used with the stretcher 16. In various embodiments, positioning element 24s is coupled with mirror 34a as shown in FIG. 5. In other embodiments, positioning element 24s may be coupled with either grating 30d or grating 30e. The positioning element 24c is used with the compressor 20. In various embodiments, positioning element 24c is coupled with grating 30g as shown in FIG. 2. In other embodiments, positioning element 24c may be coupled with grating 30f. However, as is discussed in more detail below, the positioning elements 24s, 24c may be coupled with any portion of the stretcher 16 and/or compressor 20.

In various embodiments, the system 10 operates as follows. The laser oscillator 14 generates a pulse of a few cycles that is conditioned by the AOM. The CE phase offset frequency, $f_0$, of the pulse may be locked to a percentage, e.g. 25%, of the oscillator repetition rate, frep, where frep may be 80 MHz. The output of the oscillator is split and part of the split output is input to the f-to-2f interferometer, wherein the offset frequency is derived and output to the locking electronics unit. From the offset frequency, the locking electronics unit measures an error signal $\epsilon$, where $\epsilon = f_0 - f_{rep}/4$. The error signal value is converted to an electronic signal which is fed back to the AOM, which modulates the power from the laser to stabilize the offset frequency.

Pulses with the same CE phase are selected by the PC at a desired repetition rate, e.g., 1 kHz. These pulses are forwarded to the stretcher 16. The stretcher embodiment of FIG. 4 or FIG. 5 may be used, or any known stretcher configuration. The grating separation distance $G_s$ in FIG. 4 is the distance between grating 30b and image 30c, and in FIG. 5 is between gratings 30d and 30e. The distance may be given as:

$$G_s = l_{eff} \cos(\gamma_s + \theta_s), \tag{1}$$

where $l_{eff}$ the effective linear distance between gratings 30b and 30c of FIG. 4, and between gratings 30d and 30e of FIG. 5. $\gamma_s$ is the angle of incidence, $\theta_s$ is the acute angle between the incident and diffracted rays, and $(\gamma_s + \theta_s)$ is the diffraction angle.

When the two lenses 32a, 32b are confocal or the two mirrors 34a, 34b are confocal, $l_{eff}$ may be given by:

$$l_{eff} = [l - 2(f_1 + f_2)]\left(\frac{f_1}{f_2}\right)^2, \tag{2}$$

where $f_1$ and $f_2$ are the focal lengths of the lenses or mirrors that form the telescope between the gratings 30b, 30c or 30d, 30e and l is the geometric distance between the two gratings 30b, 30c or 30d, 30e. In embodiments where $f_1 = f_2 = f$, then the equation above can be simplified to $$l_{eff} = l - 4f. \tag{3}$$

Substituting EQ. 3 into EQ. 1, the result is:

$$G_s = (l - 4f)\cos(\gamma_s + \theta_s). \tag{4}$$

Thus, the grating separation is dependent on the distance between the gratings (l) and the focal length (f) of the mirrors or lenses.

Time-stretched pulses are output from the stretcher 16 and are amplified by many orders of magnitude in the amplifier 18. The amplified pulses are then input to the compressor 20. The prism-based embodiment of FIG. 3 may be used as the compressor 20, however, the grating-based embodiment of FIG. 2 produces higher-energy laser pulses and is generally used in situations that require a higher-energy output. The grating separation distance $G_c$ for the compressor 20 is the linear distance G, as labeled in the embodiments of FIG. 2.

The compressed pulses are output from the compressor and a fraction of their energy (typically less than 1 μJ) is split, generally by a beam splitter, and coupled to the measurement device 22. The collinear f-to-2f interferometer of the measurement device 22 measures the relative CE phase of the output pulses. The interferometer converts the relative CE phase to a voltage level that is fed to the feedback controller 26.

Embodiments of the present invention allow for a desired CE phase to be established as an input to the feedback controller. As an example, the voltage level is utilized as the feedback signal input to the feedback controller 26. The summation element 50 in the feedback controller 26 adds the desired CE phase value as a positive number to the measured CE phase value from the measurement device 22 as a negative number. The result is the difference between the desired CE phase and the actual CE phase which is input to the control element 52. Based on the magnitude of the difference, the control element 52 sends a signal to the positioning elements 24c, 24s to move the pulse modification elements, as necessary.

For the compressor 20, the spectral phase of the pulse is given by:

$$\phi(\omega) = \omega\tau(\omega) - 4\pi \frac{G}{d} \tan[\gamma - \theta(\omega)], \quad (5)$$

where $\omega$ is the frequency components of the pulse and $\tau$ is the group delay. The difference in phase velocity and group velocity introduces a CE phase in the compressor, given by:

$$\varphi'_{CE} - \varphi_{CE} = \omega_0\tau(\omega_0) - \phi(\omega_0) = 4\pi \frac{G}{d} \tan[\gamma - \theta(\omega_0)], \quad (6)$$

where $\phi_{CE}'$ is the CE phase at the exit. If the separation between the gratings is changed by an amount $\Delta G$ due to thermal drift and mechanical vibration, the subsequent CE phase variation is:

$$\Delta\varphi_{CE} = 4\pi \frac{\Delta G}{d} \tan[\gamma - \theta(\omega_0)]. \quad (7)$$

When the incident angle is near the Littrow angle at which the gratings are most efficient, $\theta(\omega_0)=0$, EQ. 7 can be simplified to:

$$\Delta\varphi_{CE} = 4\pi\tan(\gamma)\frac{\Delta G}{d}. \quad (8)$$

Thus, the CE phase for the compressor 20 is dependent on the diffraction grating groove separation d, which is a constant, but more importantly on G, the separation distance of the gratings.

In various embodiments, the positioning element 24c may be coupled to one or both of the pulse modification elements—gratings 30f, 30g. The positioning element 24c is also operable to move one or both of gratings 30f, 30g, to directly control the separation distance between the gratings and thereby control the CE phase as indicated in EQ. 8. However, as discussed above, the positioning element 24c may be coupled with any portion of the compressor 20 and is not necessarily coupled with the gratings 30f, 30g. For example, the positioning element 24c may be coupled with various lenses 32.

For the stretcher 16, a derivation similar to the one above for the compressor 20 as illustrated in EQs. 5-8 yields the following expression for the $$\Delta\varphi_{CE} = 4\pi\sin(\gamma_s)\frac{\Delta l_{eff}}{d_s}. \quad (9)$$

Substituting EQ. 3 into EQ. 9 yields:

$$\Delta\varphi_{CE} = 4\pi\sin(\gamma_s)\frac{\Delta(l-4f)}{d_s}. \quad (10)$$

Thus, the CE phase depends on the diffraction grating groove separation d, which is a constant and may be different from the diffraction grating constant of the compressor 20. The CE phase is also dependent on the effective distance between the gratings (l) and the focal length (f) of the mirrors or lenses.

In various embodiments, the positioning element 24s may be coupled to pulse modification elements such as the gratings 30a, 30b, 30d, 30e. The positioning element 24s may move one or more of the gratings 30a, 30b, 30d, 30e in order to directly control the separation distance between the gratings and thereby control the CE phase by controlling l from EQ. 10.

However, as discussed above, the positioning element 24s may be coupled with any portion of the stretcher 16 and is not necessarily coupled with the gratings 30a, 30b, 30d, or 30e. For example, the positioning element 24s may be coupled to mirrors 34a, 34b in the stretcher 16 and may additionally or alternatively move the mirrors, which also controls the CE phase by controlling f from EQ. 10. Control of the motion of the mirrors (or lenses, in certain embodiments) may be advantageous because mirrors and lenses are generally lighter in weight than gratings.

As may be appreciated, the methods and apparatuses described herein may be applied to other chirped-pulse amplifier laser systems where control of the carrier-envelope phase of a generated laser pulse is desired. Thus, the exemplary equations provided above may be varied based upon the particular stretcher 16 or compressor 20 configuration employed.

It is believed that embodiments of the present invention and many of its attendant advantages will be understood by the foregoing description, and it will be apparent that various changes may be made in the form, construction and arrangement of the components thereof without departing from the scope and spirit of the invention or without sacrificing all of its material advantages. The form herein before described being merely an explanatory embodiment thereof, it is the intention of the following claims to encompass and include such changes.

Having thus described various embodiments of the invention, what is claimed as new and desired to be protected by Letters Patent includes the following:

1. A chirped pulse amplification laser system comprising:
   a laser source operable to generate a laser pulse;
   a pulse modification apparatus operable to modify at least a portion of the generated laser pulse, the pulse modification apparatus comprising first and second pulse modification elements separated by a separation distance;
   a positioning element coupled with the pulse modification apparatus and operable to reposition at least a portion of the pulse modification apparatus to vary the separation distance;
   a measurement device operable to measure the carrier envelope phase of the generated laser pulse; and
   a feedback controller coupled with the positioning element and the measurement device, the feedback controller operable to control the positioning element based on the measured carrier envelope phase to vary the separation distance of the pulse modification elements and control the carrier envelope phase of at least one laser pulse generated by the laser source.

2. The system of claim 1, wherein the pulse modification elements are selected from the group consisting of gratings, prisms, and combinations thereof.

3. The system of claim 1, wherein the pulse modification apparatus is configured as a grating stretcher operable to stretch at least a portion of the laser pulse and the first and second pulse modification elements comprise a pair of gratings.

4. The system of claim 3, wherein the positioning element is coupled with one of the gratings and operable to reposition the grating to vary the separation distance between the gratings.

5. The system of claim 3, wherein the pulse modification apparatus further includes a lens associated with the gratings and the positioning element is coupled with the lens and operable to reposition the lens to vary the separation distance between the gratings.

6. The system of claim 3, wherein the pulse modification apparatus further includes a mirror associated with the gratings and the positioning element is coupled with the mirror and operable to reposition the mirror to vary the separation distance between the gratings.

7. The system of claim 1, wherein the pulse modification apparatus is configured as a grating compressor operable to compress at least a portion of the laser pulse and the first and second pulse modification elements comprise a pair of gratings.

8. The system of claim 7, wherein the positioning element is coupled with one of the gratings and operable to reposition the grating to vary the separation distance.

9. The system of claim 7, wherein the pulse modification apparatus further includes a lens associated with the gratings and the positioning element is coupled with the lens and operable to reposition the lens to vary the separation distance between the gratings.

10. The system of claim 1, wherein the positioning element comprises a piezoelectric transducer.

11. The system of claim 1, wherein the measurement device comprises an f-to-2f interferometer.

12. The system of claim 1, wherein the feedback controller is operable to vary the carrier envelope phase of at least one generated laser pulse to a desired value.

13. A chirped pulse amplification laser system comprising:
a laser source operable to generate a laser pulse;
a grating stretcher operable to stretch at least a portion of the generated laser pulse, the grating stretcher comprising a pair of gratings separated by a separation distance;
a piezoelectric transducer coupled with the grating stretcher and operable to reposition at least a portion of the grating stretcher to vary the separation distance;
an f-to-2f interferometer operable to measure the carrier envelope phase of the generated laser pulse; and
a feedback controller coupled with the piezoelectric transducer and the interferometer, the feedback controller operable to control the piezoelectric transducer based on the measured carrier envelope phase to vary the separation distance of the gratings and control the carrier envelope phase of at least one laser pulse generated by the laser source.

14. The system of claim 13, wherein the piezoelectric transducer is coupled with one of the gratings and operable to reposition the grating to vary the separation distance.

15. The system of claim 13, wherein the grating stretcher further includes a lens associated with the gratings and the piezoelectric transducer is coupled with the lens and operable to reposition the lens to vary the separation distance between the gratings.

16. The system of claim 13, wherein the grating stretcher further includes a mirror associated with the gratings and the piezoelectric transducer is coupled with the mirror and operable to reposition the mirror to vary the separation distance between the gratings.

17. The system of claim 13, further including—
a grating compressor operable to compress at least a portion of the laser pulse stretched by the grating stretcher, the grating compressor comprising a second pair of gratings separated by a separation distance, and
a second piezoelectric transducer coupled with the grating compressor and operable to reposition at least a portion of the grating compressor to vary the separation distance of the second pair of gratings,
the feedback controller being coupled with the second piezoelectric transducer and operable to control the second piezoelectric transducer based on the measured carrier envelope phase to vary the separation distance of the second pair of gratings and stabilize the carrier envelope phase of at least one laser pulse generated by the laser source.

18. The system of claim 17, wherein the grating compressor further includes a lens associated with the second pair of gratings, and the system further includes a third piezoelectric transducer coupled with the lens, the feedback controller being operable to control the first, second, and third piezoelectric transducers to stabilize the carrier envelope phase of at least one laser pulse generated by the laser source.

19. The system of claim 13, wherein the feedback controller is operable to vary the carrier envelope phase of at least one generated laser pulse to a desired value.

* * * * *